(12) United States Patent
Chang et al.

(10) Patent No.: US 6,417,884 B1
(45) Date of Patent: Jul. 9, 2002

(54) IMAGE PICK-UP DEVICE MOUNTING ARRANGEMENT

(75) Inventors: Wei-Chih Chang; Ching-Lung Liu; Hsi-Chin Chang; Ko-Sheng Chiang, all of Taipei (TW)

(73) Assignee: First International Computer, Inc., Taipei (TW)

( * ) Notice: Subject to any disclaimer, the term of this patent is extended or adjusted under 35 U.S.C. 154(b) by 0 days.

(21) Appl. No.: 09/133,490

(22) Filed: Aug. 12, 1998

(30) Foreign Application Priority Data

Dec. 30, 1997 (TW) ...................................... 86221694 U

(51) Int. Cl.[7] .............................................. H04N 5/225
(52) U.S. Cl. ...................................... 348/373; 348/376
(58) Field of Search ............................... 348/14.08, 373, 348/374, 375, 376, 552, 49, 65; 361/681

(56) References Cited

U.S. PATENT DOCUMENTS 5,497,296 A * 3/1996 Satou et al. ................. 361/681
5,708,853 A * 1/1998 Sanemitsu ................... 348/376
5,765,063 A * 6/1998 Fukuda et al. ................ 348/49
5,768,163 A * 6/1998 Smith, II .................... 348/552
5,801,919 A * 9/1998 Griencewic .................. 348/552
6,069,651 A * 5/2000 Tsuyuki et al. ............... 348/65
6,141,052 A * 10/2000 Fukumitsu et al. ......... 348/373

FOREIGN PATENT DOCUMENTS

JP 1-133012 * 5/1989 ............ G02B/7/00

* cited by examiner

Primary Examiner—Wendy R. Garber
Assistant Examiner—Luong Nguyen
(74) Attorney, Agent, or Firm—Bacon & Thomas

(57) ABSTRACT

An image pick-up device mounting arrangement includes a CCD (charge-coupled device) module mounted in an opening at a notebook computer's cover housing, which hold an LCD module, the CCD module being controlled by the notebook computer to pick up the image of the scene before it by using of a lens and a circuit board thereof, and to convert picked-up image signals into digital data for storing in memory in the notebook computer or transmission to a video conference system through a modem.

7 Claims, 4 Drawing Sheets

IMAGE PICK-UP DEVICE MOUNTING ARRANGEMENT

BACKGROUND OF THE INVENTION

The present invention relates to a notebook computer, and more specifically to the mounting arrangement of an image pickup device in a notebook computer. The image pick-up device is modularized and mounted in an opening of the cover housing of the LCD module of the notebook computer, and controlled by the notebook computer to pick up the image of the scene before it, and to convert picked up image signal into digital data for storing in memory means in the notebook computer or transmission to a video conference system through a modem.

In a multimedia notebook computer, an image pick-up device may be provided and controlled by the notebook computer to pick up the image of the scene before it, enabling picked-up image signals to be converted into digital data for transmission to a video conference system through a modem. FIG. 4 shows an image pick-up device 50 mounted on the cover housing 42 of the LCD 41 of a notebook computer 40, and connected to the mainframe of the notebook computer 40 by an electrical cable. According to this design, the image pick-up device 50 requires much installation space. Further, the image pick-up device 50 tends to be damaged because it protrudes from one lateral side of the cover housing 42 of the LCD 41.

SUMMARY OF THE INVENTION

The present invention has been accomplished to provide an image pick-up device mounting arrangement for a notebook computer which eliminates the aforesaid problems. According to one aspect of the present invention, the image pick-up device mounting arrangement includes a CCD (charge-coupled device) module mounted in an opening at the notebook computer's cover housing, which holds an LCD module, the CCD module being controlled by the notebook computer to pick up the image of the scene before it by means of a lens and a circuit board thereof, and to convert picked-up image signals into digital data for storing in memory means in the notebook computer or transmission to a video conference system through a modem. Because the CCD module is mounted in an opening of the cover housing of the notebook computer, it becomes a part of the notebook computer when installed.

According to another aspect of the present invention, the cover housing of the notebook computer has two release key-controlled retainer rods at two opposite sides of the LCD module for connection to respective retaining holes on the keyboard housing of the mainframe of the notebook computer, enabling the over housing to be retained closed on the mainframe of the notebook computer.

According to still another aspect of the present invention, the CCD module comprises a focus knob for adjusting the focusing length of the lens thereof.

DETAILED DESCRIPTION OF THE PREFERRED EMBODIMENT

Figure 1:
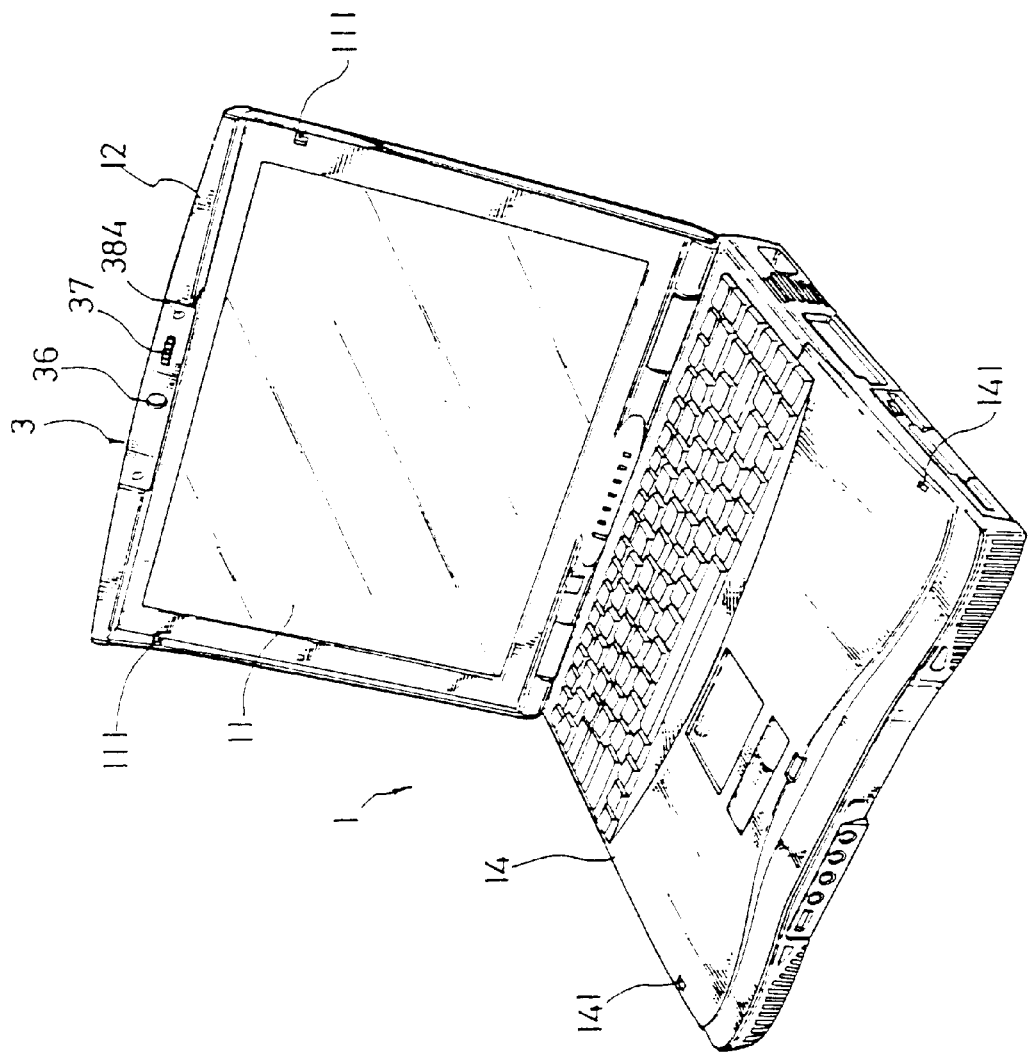
FIG. 1 is a perspective view of the present invention.
Figure 2:
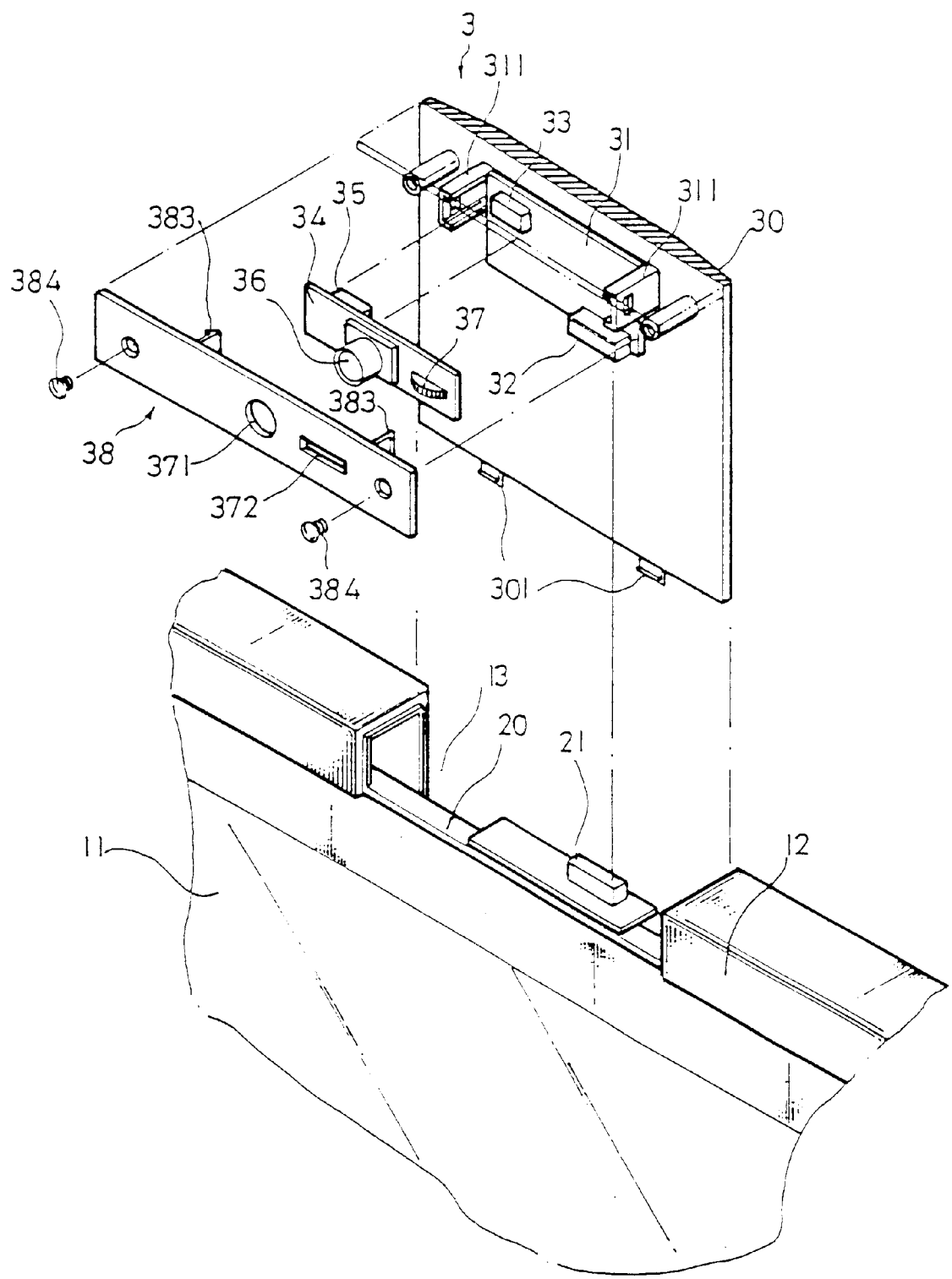
FIG. 2 is an exploded view in an enlarged scale of a part of FIG. 1, showing the structure of the CCD module.
Figure 3:
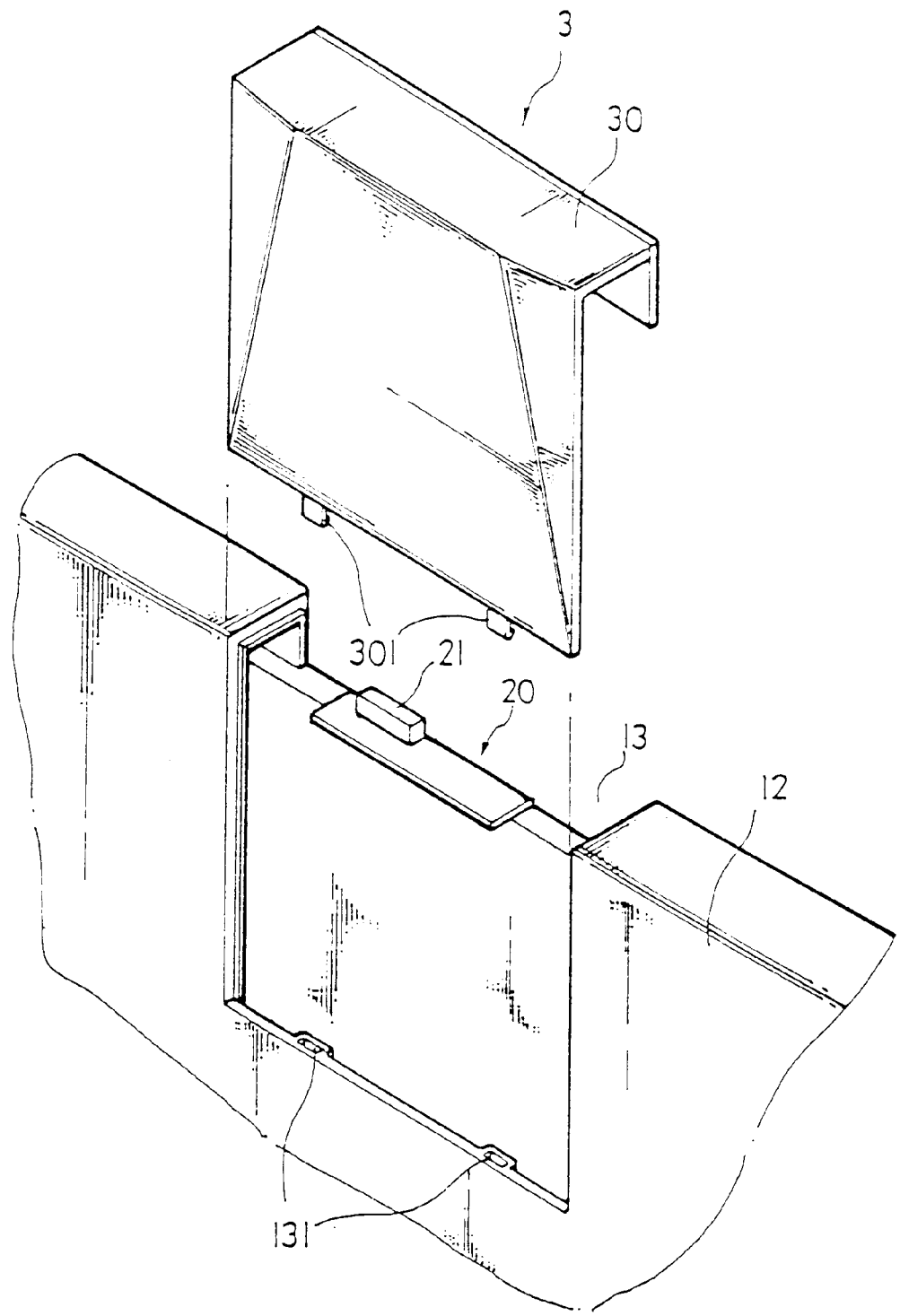
FIG. 3 is a back side view of FIG. 2.
Figure 4:
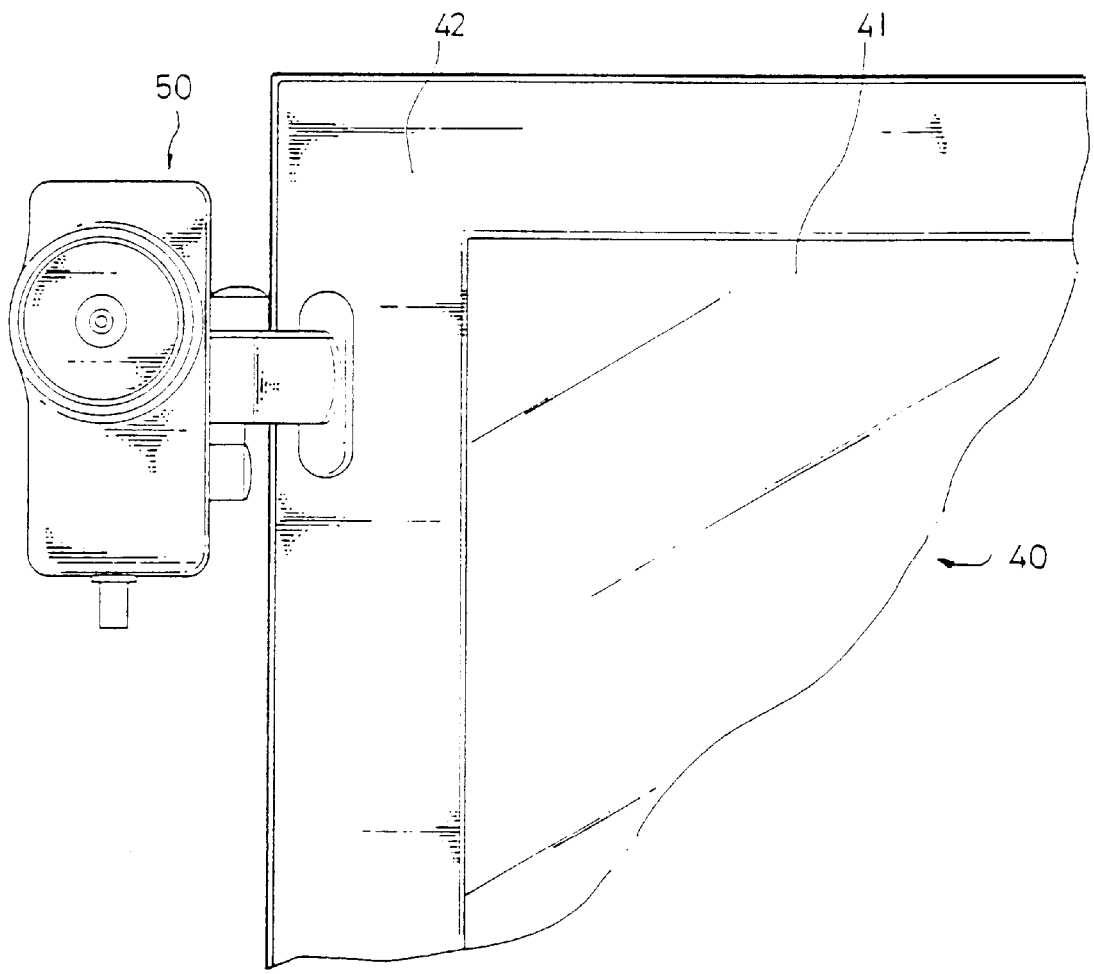
FIG. 4 shows an image pick-up device installed in the housing of the LCD of a notebook computer according to the prior art.

Referring to FIGS. 1, 2 and 3, a notebook computer 1 is shown having a cover housing 12 and an LCD (liquid crystal display) module 20 mounted within the cover housing 12. The LCD module 20 holds a display screen 11, and is electrically connected to the mother board in the main frame of the notebook computer 1. An opening 13 is formed at the periphery of the cover housing 12. The opening 13 can be made at the desired location, for example at the top side of the LCD module 20 (see FIG. 2). The LCD module 20 has an electrical connector 21 at the top side within the opening 13. At least one, for example two, retaining holes 131 are provided at the cover housing 12 in the opening 13 at the back side of the LCD module 20 (see FIG. 3). Two retainer elements 111 are provided at the LCD module 20 at two opposite lateral sides of the display screen 11 (see FIG. 1).

An image pick-up device, for example a CCD (charge-coupled device) module 3, is mounted in the opening 13, and electrically connected to the notebook computer 1 to pick up images and to convert picked-up image signals into digital data for storage in memory means in the notebook computer 1.

The CCD module 3 comprises a L-shaped base frame 30 fitting the opening 13, the L-shaped base frame 30 having two hooks 301 at one end respectively hooked in the retaining holes 131 of the cover housing 12 at the back side of the LCD module 20 and two upright supports 311 arranged in parallel at an inner side, a circuit board 31 mounted on the base frame 30 between the upright supports 311, the circuit board 31 having a first electrical connector 32 connected to the electrical connector 21 at the LCD module 20 and a second electrical connector 33, a lens module 34 mounted on the circuit board 31, the lens module 34 comprising an electrical connector 35 connected to the second electrical connector 33 of the circuit board 31, a lens 36, and a focus knob 37 for adjusting the focusing length of the lens 36, and a cover plate 38 fastened to the upright supports 311 to hold the lens module 34 in place. The cover plate 38 comprises two mounting rods 383 raised from the back side wall thereof and respectively fastened to the upright supports 311 of the base frame 30, a first through hole 381 which receives the lens 36, a second through hole 382 which receives the focus knob 37. Further, fastening elements for example screws 384 may be used and fastened to the cover plate 38 and the base frame 30 to fixedly secure the cover plate 38 and the base frame 30 together.

The keyboard housing 14 of the notebook computer 1 has two retaining holes 141 bilaterally disposed at the top side (see FIG. 1). When the notebook computer 1 is closed, i.e., when the cover housing 12 (the LCD module 20) is closed on the keyboard housing 14, the retainer elements 111 are forced into engagement with the retaining holes 141 to secure the notebook computer 1 in the closed position.

When the base frame 30 is inserted into the opening 13 on the cover housing 12, the hooks 301 of the base frame 30 are forced into engagement with the retaining holes 131 at the cover housing 12, and the first electrical connector 32 of the CCD module 3 is connected to the electrical connector 21 at the LCD module 20, and therefore the CCD module 3 becomes a part of the notebook computer 1. The retainer elements 111 can be disengaged from the retaining holes 141 on the keyboard housing 14 by means of operating two release keys (not shown) at two opposite sides of the cover housing 12. When the notebook computer 1 is opened, the CCD module 3 is aimed at the user, and the focusing length of the lens 36 is adjusted through the focus knob 37. When the notebook computer 1 is operated to start the CCD module 3, the image of the user (the scene in front of the lens 36) is picked up by the CCD module 3 and converted into digital data, and then stored in memory means in the notebook computer 1 or transmitted by the notebook computer 1 to a video conference system through a modem.

While only one embodiment of the present invention has been shown and described, it will be understood that various modifications and changes could be made thereunto without departing from the spirit and scope of the invention disclosed.

What the invention claimed is:

1. An image pick-up device mounting arrangement comprising:

a notebook computer having an opening at a cover housing thereof at a top side of a LCD (liquid crystal display) module thereof, an electrical connector mounted on said LCD module within said opening and electrically connected to a mainframe thereof, and at least one retaining hole in said cover housing at said opening in a back side of said LCD module; and a CCD (charge-coupled device) module mounted in said opening, said CCD module being controlled by said notebook computer to pick up an image of a scene before it, and to convert picked-up image signals into digital data for storing in memory means in said notebook computer or transmission to a video conference system through a modem, said CCD module comprising a base frame fitted into said opening, said base frame comprising two upright supports, a circuit board mounted on said base frame between said upright supports, and a lens module mounted on said circuit board, said lens module comprising a lens for picking up the image of the scene before it, wherein said lens module includes a focus knob and is secured to said circuit board by a cover plate, said CCD module being positioned between said cover plate and said circuit board and a lens in said lens module extending through an opening in said cover plate, said cover plate further including an opening for a focus knob for adjusting the focusing length of said lens, and wherein said cover plate comprises two mounting rods extending from a back side wall thereof and respectively fastened to the upright supports of said base frame.

2. The image pick-up device mounting arrangement of claim 1 wherein said base frame of said CCD module has at least one hook means respectively fastened to the at least one retaining hole in said cover housing in said opening.

3. The image pick-up device mounting arrangement of claim 1 wherein said circuit board of said CCD module comprises a first electrical connector connected to the electrical connector at said LCD module for signal output to said notebook computer, and a second electrical connector for signal input.

4. The image pick-up device mounting arrangement of claim 3 wherein said lens module has an electrical connector connected to the second electrical connector of said circuit board for signal output to said circuit board.

5. The image pick-up device mounting arrangement of claim 1 wherein said cover plate is fixedly secured to said base frame by fastening elements.

6. The image pick-up device mounting arrangement of claim 1 wherein said LCD module comprises two retainer rods bilaterally disposed at a front side thereof for securing said LCD module and said cover housing in a closed position when said LCD module is closed on the mainframe of said notebook computer.

7. The image pick-up device mounting arrangement of claim 6 wherein said notebook computer has two retaining holes bilaterally disposed at a top side of a keyboard housing of the mainframe for receiving the retainer rods of said LCD module to hold said LCD module and said cover housing in said closed position.

* * * * *